United States Patent [19]

Yasuoka

[11] Patent Number: 4,655,675
[45] Date of Patent: Apr. 7, 1987

[54] ARTICULATED ROBOT

[75] Inventor: Hirotoshi Yasuoka, Aichi, Japan

[73] Assignee: Mitsubishi Denki Kabushiki Kaisha, Tokyo, Japan

[21] Appl. No.: 571,970

[22] Filed: Jan. 18, 1984

[30] Foreign Application Priority Data

Jan. 18, 1983 [JP] Japan .................................. 58-6073
Jan. 26, 1983 [JP] Japan ................................. 58-10903

[51] Int. Cl.⁴ ............................................ B66C 23/00
[52] U.S. Cl. .................................... 414/735; 414/917; 901/28
[58] Field of Search .................. 414/735, 917; 901/26, 901/28, 29

[56] References Cited

U.S. PATENT DOCUMENTS

| 4,188,166 | 2/1980 | Moreau et al. | 414/735 |
| 4,367,998 | 1/1983 | Causer | 414/735 |
| 4,480,495 | 11/1984 | Obama | 901/28 X |
| 4,507,046 | 3/1985 | Sugimoto et al. | 414/735 |

FOREIGN PATENT DOCUMENTS

| 0077609 | 4/1983 | European Pat. Off. . | |
| 2851958 | 6/1979 | Fed. Rep. of Germany | 901/26 |
| 1111039 | 4/1968 | United Kingdom . | |
| 1563437 | 3/1980 | United Kingdom . | |
| 2053148 | 2/1981 | United Kingdom . | |

Primary Examiner—William E. Wayner
Attorney, Agent, or Firm—Sughrue, Mion, Zinn, Macpeak, and Seas

[57] ABSTRACT

An articulated robot has a fixing stand for supporting the robot body and a swivel stand which is rotatably disposed on the fixing stand. An upper arm which is rotatably connected at one end to the swivel stand has a forearm rotatably connected to its other end. The forearm has an operating part at one end and includes a plurality of wrists which are sequentially connected between the operating part and the upper arm. The wrists are directly driven by a plurality of drive motors mounted within the plurality of wrists and along the central axis of the forearm.

14 Claims, 7 Drawing Figures

ARTICULATED ROBOT

BACKGROUND OF THE INVENTION

This invention relates to an articulated robot, and particularly to an articulated robot having plural driving shafts and driving motors which drive the driving shafts.

Various kinds of articulated robots are used for various functions such as arc welding, material handling, coating, and the like. In the present application the invention will be described with reference to an articulated arc welding robot; however, the present invention is not limited only to articulated arc welding robots.

In FIG. 1 an articulated arc welding robot is shown to comprise a swivel stand 12 which is rotatably disposed on a fixed stand 10, which supports the robot body, and connected to the swivel stand 12 is an upper arm 14.

The upper arm 14 is connected at one end to a link 18. The other end of the upper arm 14 is connected to a forearm 22, and a welding torch 24 is supported at the tip of the forearm 22. A link 20 is connected between the link 18 and the forearm 22.

In addition, the above-mentioned swivel stand 12 is driven by a driving motor (not shown), mounted in the fixed stand 10, via a reduction gear, and the welding torch 24 is driven by a driving motor 26.

In a conventional articulated arc welding robot, the driving motor 26 is mounted on the side of the swivel stand 12, and the motor 26 projects therefrom, as shown in FIG. 2. As a result, the driving motor 26 enters into the mounting region of the jig, and thus a disadvantage of the conventional robot is that the movement region of the robot becomes narrow, as shown by the chain line in FIGS. 1 and 2.

In other words, the projecting part of the driving motor 26 is arranged such that it contacts the jig, to which an article to be welded is attached, when the swivel stand 12 is rotated. Therefore it becomes necessary to determine the movement region of the robot in which the motor 26 will not contact the jig. In order to prevent contact between the jig and motor 26, the movement region must be narrowed.

Other conventional arc welding robots are constructed so that the driving power of the driving motor 26, disposed at the side of the swivel stand 12, is transmitted to the welding torch 24 via a chain, a timing belt or the like. However, repeated use of these robots with quick acceleration and deceleration produces a backlash in the chain, timing belt or the like. As a result, the position-determining precision of the welding torch 24 is lowered, and to compensate for this, the upper arm 14 and the forearm 22 must be large-sized. Therefore, in the conventional robot, high-speed movement of the robot is limited, and the interference region of the robot with the jig is larger when the robot is being swivelled.

Another conventional articulated arc welding robot is shown in FIG. 3. This robot includes four wrists, which have been designed for several purposes, namely, optimizing welding pose, using a TIG arc welding robot, using a sensor for detecting a welding line, or the like.

In FIG. 3, a swivel stand 112 is rotatably disposed on a fixed stand 110, which supports the robot body, and an upper arm attaching stand 114 is secured on the upper surface of the swivel stand 112. The swivel stand 112 can be rotated in the directions shown by arrows A and B. An upper arm 118, at one end, is supported in bearings 116 located on the upper surface of the upper arm attaching stand 114, and the upper arm 118 can be tilted in the directions shown by the arrows C and D. A forearm 124 is rotatably supported in bearings 120, located at the other end of the upper arm 118, by a shaft 122, and a welding torch 126 is supported at the tip of the forearm 124.

The forearm 124 comprises sequentially connected plural wrists 128, 130, 132 and 134. In other words, at the bearings 120 of the upper arm 118 is supported one end of the first wrist 128 which is rotatable in the directions shown by arrows E and F about the shaft 122; at the other end of the first wrist 128 is disposed the second wrist 130 which is rotatable in the directions shown by arrow G; at the lower end of the second wrist 130 is disposed the wrist 132 which is rotatable in the directions shown by arrow H; at the third wrist 132 is disposed the fourth wrist 134 which is rotatable in directions shown by arrow I; and the welding torch 126 is supported at the tip of the fourth wrist 134.

The following driving mechanisms are disposed at respective parts of the robot for the purpose of driving the swivel stand 112, the upper arm 118 and wrists 128, 130, 132 and 134 of the forearm 124.

Accordingly, a driving motor (not shown) is mounted in the fixed stand 110 for rotating the swivel stand 112, and the driving force of the motor is transmitted to the swivel stand 112 through chains, timing belts or the like. The driving motors 136 and 138 are disposed at the bearing 116 and are used for rotating the upper arm 118 and the first wrist 128, respectively. The driving forces of motors 136 and 138 are transmitted to the upper arm 118 and first wrist 128 through chains, timing belts or the like.

Furthermore, a driving motor (not shown) is mounted in the first wrist 128 and is used for rotating the second wrist 130. The driving force of the driving motor is transmitted to the second wrist through chains, timing belts or the like.

Driving motors (not shown) are also mounted in the second wrist 130 and the third wrist 132 and are used for rotating the third wrist 132 and the fourth wrist 134, respectively. The driving forces of the driving motors are transmitted to the third wrist 132 and the fourth wrist 134 via chains, timing belts or the like.

However, in the conventional articulated arc welding robot shown in FIG. 3 the driving motors 136 and 138 are disposed so that they project from both outer sides of the bearing 116, in the same manner as the conventional robots shown in FIGS. 1 and 2, and therefore the driving motors 136 and 138 enter into the movement range of the robot and the mounting region of the jig. As a result, the movement region of the robot is narrowed.

Because the driving forces of the driving motor 138 and the driving motor mounted in the first wrist 128 are transmitted to the first wrist 128 and the second wrist 130 through chains, timing belts or the like, the repeated use of the robot with quick acceleration and deceleration produces a backlash in the chain, timing belt or the like. As a result, the position-determining precision of the welding torch 126 is lowered, and to compensate for this the upper arm 118 and the first wrist 128 must be large-sized. Therefore, the high-speed movement of this robot is also limited and the interference region of the robot with the jig is larger when the robot is being swivelled.

Furthermore, the second wrist 130 of the forearm 124 is disposed to one side of the forearm 124 and is therefore shifted away from the central axis of the forearm, which results in decreased operational efficiency. The decrease in the operational efficiency is caused by the wrist shifts away from the central axis of the robot giving rise to an optical illusion, which interferes with proper positioning of the robot, during robot instructions for setting various target angles via rotation of the wrists.

Additionally, in the conventional arc welding robot, there is a further disadvantage in that the second wrist 130 of the forearm 124 is not used for determining the position of the welding torch 126 at an optional position; but rather the second wrist 130 is disposed so that the tip of the welding torch 126 always takes a certain direction when the upper arm 118 is tilted in the directions of arrows C and D, and therefore only three wrists 128, 132 and 134 substantially work effectively.

SUMMARY OF THE INVENTION

This invention has been designed in view of the above-mentioned problems in conventional robots, and an object of the invention is to provide an articulated robot which determines the position of an operating portion, such as a welding torch or the like, with high precision.

Another object of this invention is to provide a robot with excellent controllability characteristics.

A further object of this invention is to provide a robot having a large movement region.

In order to accomplish the above-mentioned objects, this invention has been designed to include a fixed stand for supporting a robot body, a swivel stand rotatably disposed on an upper part of the fixed stand, an upper arm connected to the swivel stand, and a forearm which is rotatably connected to the upper arm and which supports an operating part at its tip. The forearm includes a first wrist, a second wrist and a third wrist, which are sequentially connected to the upper arm, two driving motors and reduction gears mounted in the first and second wrists, wherein each driving motor in the first and second wrists, respectively, drives the second and third wrists and each reduction gear in the first and second wrists, respectively, transmits driving force directly to the second and third wrists and wherein the driving motors are mounted along the central axis of the forearm.

DETAILED DESCRIPTION OF THE INVENTION

Figure 1:
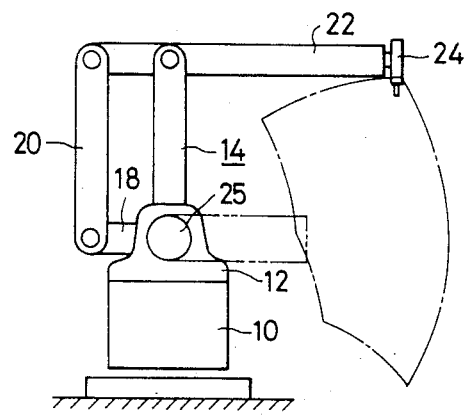
FIG. 1 is a front elevation view of a conventional articulated arc welding robot, as a typical example.
Figure 2:
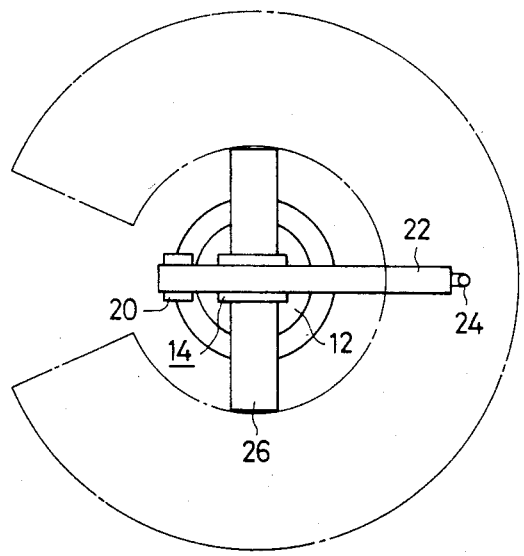
FIG. 2 is a plan view of FIG. 1.
Figure 3:
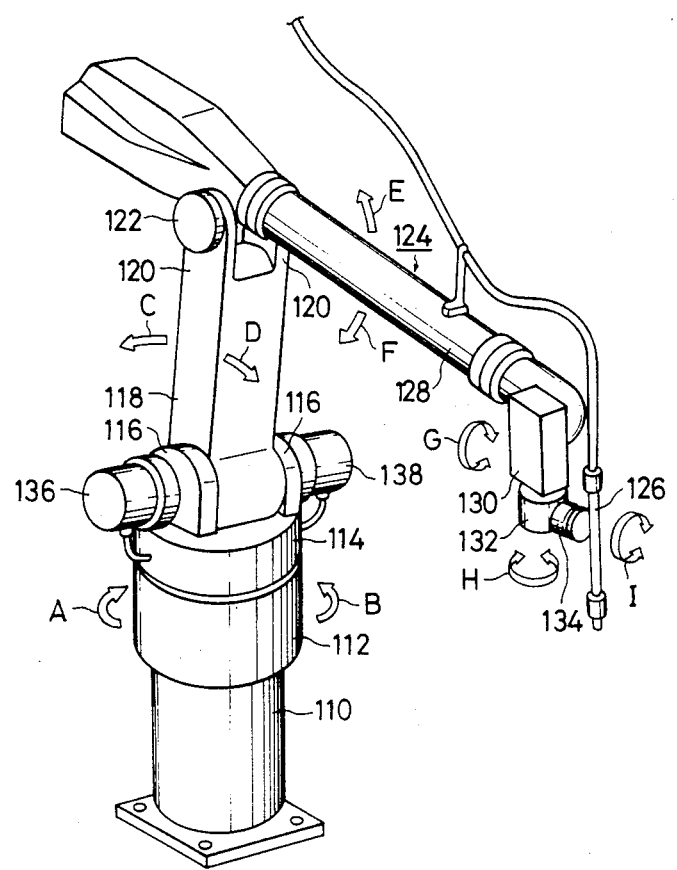
FIG. 3 is a pictorial view which shows another articulated conventional arc welding robot.
Figure 4:
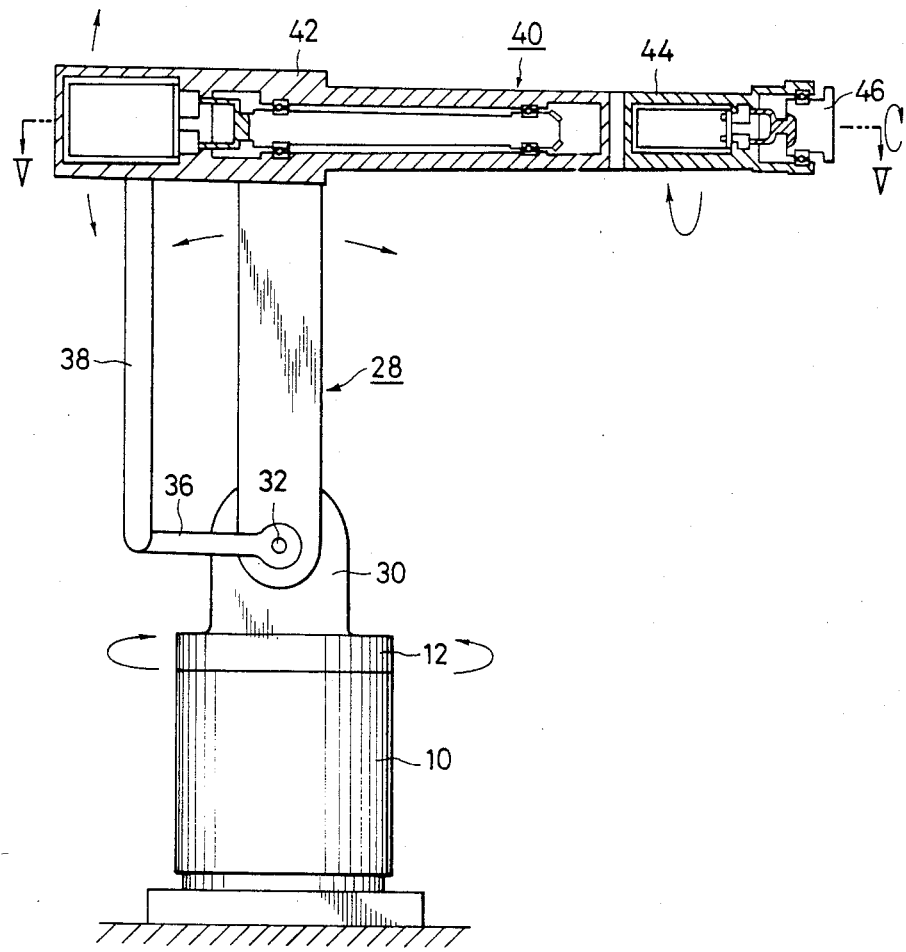
FIG. 4 is a partial sectional view of an articulated arc welding robot according to this invention.
Figure 5:
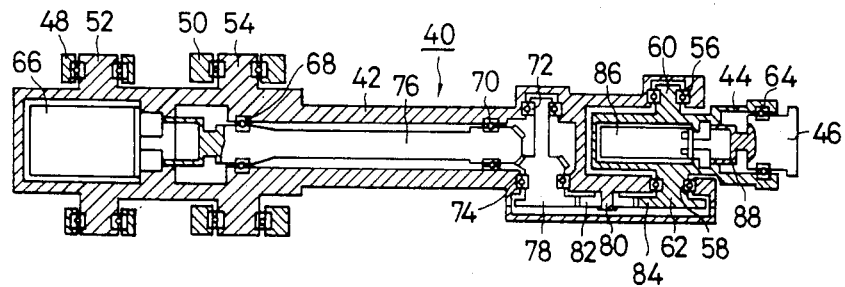
FIG. 5 is a sectional view taken substantially along line V—V of FIG. 4.

A first embodiment of an articulated arc welding robot according to this invention is shown in FIG. to comprise a two-axes wrist structure. In FIG. 4, a swivel stand 12 is rotatably disposed on the upper surface of a fixed stand 10 which supports a robot body, and an upper arm 28 is connected to the swivel stand 12. One end of the upper arm 28 and one end of a link 36 are separated in a bearing 30, formed on the upper surface of the swivel stand 12, by means of a shaft 32. One end of a link 38 is connected to the other end of the link 36. Also, a forearm 40 is rotatably connected to the other end of the upper arm 28, and a welding torch (not shown) is supported at one end of the forearm 40. Furthermore, the forearm 40 includes three wrists 42, 44 and 46 which are sequentially connected along the central axis of the forearm. Thus, as shown in FIG. 5, shafts 52 and 54 of the first wrist 42 are rotatably supported by bearings 48 and 50 which are disposed at the other ends of the upper arms 28 and the link 38; the shafts 60 and 62 of the second wrist 44 are rotatably supported by bearings 56 and 58, which are disposed on the inner surface of the first wrist 42; and the third wrist 46 is rotatably supported by a bearing 64 which is disposed on the inner surface of the second wrist 44.

For the purpose of driving the swivel stand 12, the upper arm 28 and the respective wrists 42, 44 and 46 of the forearm 40, the following driving mechanisms are disposed in respective parts of the robot. Thus, the swivel stand 12 is driven by a driving motor (not shown), which is mounted in the fixed stand 10, through a reduction gear, and the first wrist 42 of the forearm 40 is driven by a driving motor (not shown) mounted in the upper arm 28.

Furthermore, a driving motor 66 is mounted in the first wrist 42 for rotationally driving the second wrist 44, and a reduction transmitting mechanism is also provided in the first wrist 42. Thus, reduction gears 76 and 78 are rotatably supported by bearings 68, 70, 72 and 74, which are disposed on the inner surface of the first wrist 42. A reduction gear 82 which engages with the reduction gear 78 is rotatably supported by the shaft 80 which is disposed on the inner surface of first wrist 42. The reduction gear 82 also engages with a reduction gear 84 which is mounted at the tip of the shaft portion 62 of the second wrist 44. The driving force of the driving motor 66 is transmitted to the second wrist 44 through the reduction gears 76, 78, 82 and 84. Furthermore, a driving motor 86, for rotationally driving the third wrist 46, is mounted in the second wrist 44. The driving force of the driving motor 86 is transmitted to the third wrist 46 through a reduction gear 88 mounted in the second wrist 44. And as is apparent from FIGS. 4 and 5, the driving motors 66 and 86 are arranged along the central axis of the forearm 40.

As mentioned above, the driving force of the driving motors 66 and 86 is directly transmitted to the respective wrists 44 and 46 through the reduction gears 76, 78, 82, 84 and 88, so that very little backlash is generated, even on repeated quick acceleration and deceleration of the robot. Thus, the position-determining precision of the welding torch can be improved, the upper 28 and the forearm 40 can become small-sized, quick movement of the robot is facillitated, and at the same time the moving region of the robot becomes larger.

Furthermore, because driving motors 66 and 86 are mounted in the first wrist 42 and the second wrist 44, respectively, and are arranged along the central axis of the forearm 40, the controllability of the robot can be improved.

According to this invention, as explained above, the forearm comprises a first wrist, a second wrist and a third wrist which are sequentially connected to the upper arm. The two motors which drive the second wrist and the third wrist and the reduction gears, which transmit directly the driving forces of the driving motors to the second wrist and the third wrist, respectively, are mounted in the first wrist and the second wrist, respectively. The driving motors mentioned above are arranged along the central axis of the forearm, so that the position-determining precision of the welding torch can be improved. Therefore, the invention provides an articulated arc welding robot which has excellent controllability characteristics and which comprises a two-axes wrist structure with a large movement region.

The robot shown in FIGS. 4 and 5 is constructed such that the swivel stand is rotatably disposed on the upper surface of the fixed stand and supports the robot body, the upper arm is tiltably disposed on the upper surface of the swivel stand, the forearm is rotatably connected to the upper arm, and a welding torch is supported on the tip of the forearm with the above-mentioned forearm having three wrists sequentially connected to the upper arm. Therefore, it is practically a five-axes robot, and the target angle of the torch is not limited.

Figure 6:
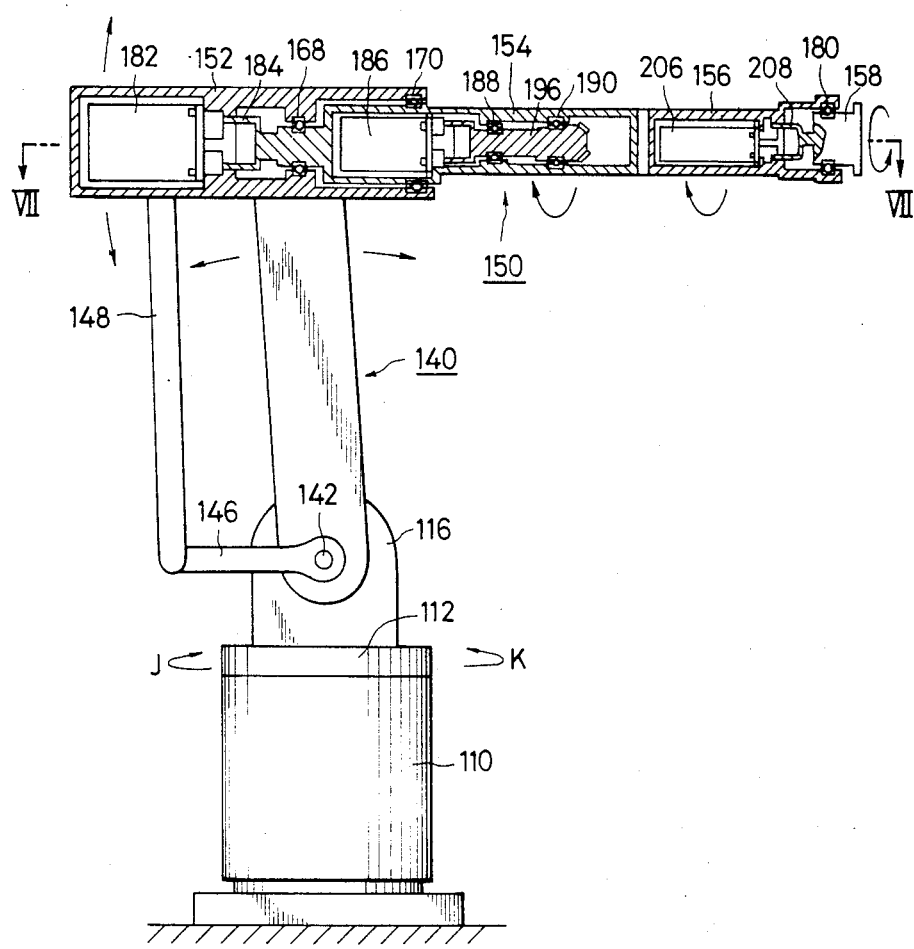
FIG. 6 is a partial sectional view of another articulated arc welding robot according to this invention.
Figure 7:
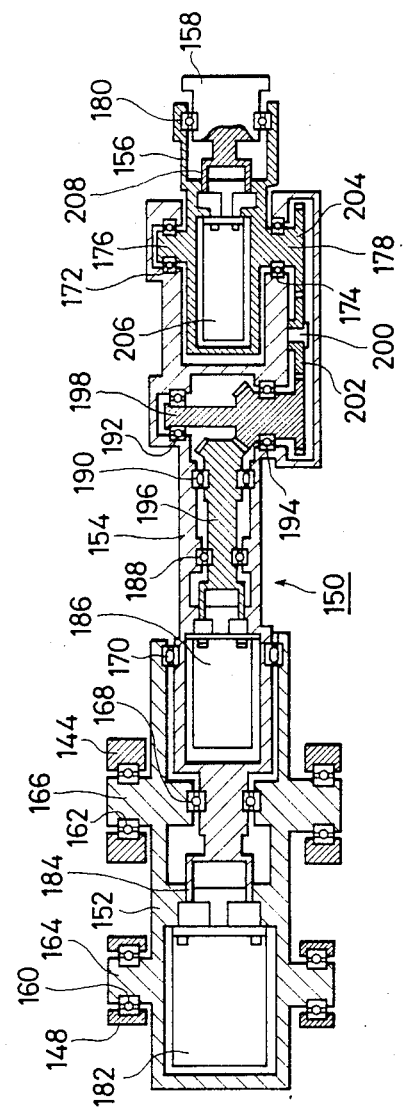
FIG. 7 is a sectional view taken substantially along line VII—VII of FIG. 6.

FIG. 6 shows a second embodiment of an articulated arc welding robot, having a six-axes structure including a three-axes wrist structure, and FIG. 7 shows a sectional view taken substantially along the line VII—VII of FIG. 6.

In FIG. 6, a swivel stand 112 is rotatable in the directions shown by arrows J and K, and is disposed on the fixing stand 110, which supports the robot body. An upper arm 140 is connected to the swivel stand 112. One end of the upper arm 140 and one end of a link 146 are disposed at a bearing 116, formed on the upper surface of the swivel stand 112, through a shaft 142. One end of a link 148 is connected to the other end of the link 146.

A forearm 150 is rotatably connected to the other end of the upper arm 140, and a welding torch (not shown) is supported at one end of the forearm 150. Furthermore, the forearm 150 has four wrists sequentially connected to the upper arm 140, and these wrists 152, 154, 156 and 158 are arranged on the central axis of the forearm. Thus, as shown in FIG. 7, the shaft parts 164 and 166, of the first wrist 152, are rotatably supported at the bearings 160 and 162, respectively, disposed at the other ends of the upper arm 140 and the link 148; the second wrist 154 is rotatably supported at the bearings 168 and 170 disposed in the inner surface of the first wrist 152; the shaft parts 176 and 178, of the third wrist 156, are rotatably supported at the bearings 172 and 174, respectively, disposed in the inner surface of the second wrist 154; and the fourth wrist 158 is rotatably supported at the bearing 180 disposed in the inner surface of the third wrist 156.

Furthermore, the following driving mechanisms are mounted on the respective parts of the robot for the purpose of driving the above-mentioned swivel stand 112, the upper arm 140 and the respective wrists 152, 154, 156 and 158 of the forearm 150. Thus, the swivel stand 112 is driven by a driving motor (not shown), mounted in the fixing stand 110, through a reduction gear and the first wrist 152 of the forearm 150 is driven by a driving motor (not shown) through the links 146 and 148. A driving motor 182 is mounted in the first wrist 152 for rotatably driving the second wrist 154, and the driving force of the driving motor 182 is transmitted to the second wrist 154 through the reduction gear 184 mounted in the first wrist 152. Also, a driving motor 186 is mounted in the second wrist 154 for rotatably driving the third wrist 156, and a reduction-transmitting mechanism for transmitting the driving force of the driving motor 186 to the third wrist 156 is mounted in the second wrist 154.

The reduction-transmitting mechanism comprises the reduction gears 196 and 198 rotatably supported at the bearings 188, 190, 192 and 194 which are disposed in the inner surface of the second wrist 154; one or more reduction gears 202, which engage with the reduction gear 198 and which are rotatably supported at the shaft 200, disposed in the inner surface of the second wrist 154; and the reduction gear 204, which engages with the reduction gears 202 and which is mounted at the tip of a shaft 178 of the third wrist 156. The driving force of the driving motor 186 is transmitted to the third wrist 156 through the reduction gears 196, 198, 202 and 204. Moreover, a driving motor 206 is mounted in the third wrist 156 and is used for driving the fourth wrist 158. The driving force of the driving motor 206 is transmitted to the fourth wrist 158 through the reduction gear 208 mounted in the third wrist 156.

As is apparent from FIGS. 6 and 7, the driving motors 182, 186 and 206 are arranged along the central axis of the forearm 150. Accordingly, the second wrist 154 rotates around the central axis of the first wrist 152, the third wrist 156 rotates around the second wrist 154, and the fourth wrist 158 rotates around the central axis of the third wrist 156.

Because the driving forces of the driving motors 182, 186 and 206 are transmitted directly to the respective wrists 154, 156 and 158 through the reduction gears, very little backlash is generated even when the robot has repeated operations of quick acceleration and deceleration, the position-determining precision of the welding torch is improved, and the upper arm 140 and forearm 150 can be made small in size. Therefore, the high-speed movement of the robot is facilitated and the moving region of the robot becomes larger. Moreover, because the driving motors 182, 186 and 206 are mounted in the first wrist 152, the second wrist 154 and the third wrist 156, respectively, and also are mounted along the central axis of the forearm 150, the controllability characteristics of the robot are excellent.

Specifically, because the robot of this embodiment has a six-axes structure including the swivel stand 112, the upper arm part 140 and the respective wrists 152, 154, 156 and 158 of the forearm part 150, improved controllability is obtained. In other words, because the embodiment is a six-axes robot, more positions are possible and a reproducibility precision of repeated positions on the order of ±0.2 mm or less can be realized.

According to this embodiment, the forearm is provided with a first wrist, a second wrist, a third wrist and a fourth wrist which are sequentially connected to the upper arm, three driving motors and reduction gears are respectively mounted in the first wrist, the second wrist and third wrist. The three driving motors drive the second wrist, the third wrist and the fourth wrist, respectively, and the reduction gears transmit directly the driving forces of the driving motors to the second wrist, the third wrist and the fourth wrist. The driving motors, mentioned above, are arranged along the central axis of the forearm, so that the position-determining precision can be improved, and an articulated arc welding robot having a three-axis wrist structure is provided which has excellent controllability characteristics and which has a large moving region.

I claim:

1. An articulated robot comprising:
   a fixed stand for supporting a robot body;
   a swivel stand rotatably disposed on said fixed stand;
   an upper arm which at one end is rotatably connected to said swivel stand;
   a forearm which at one end is rotatably connected to the other end of said upper arm, said forearm including a first wrist, a second wrist and a third wrist which are sequentially connected to said upper arm along a central axis of said forearm, said first and second wrists being connected along a first pivot axis about which said first and second wrists relatively rotate, center axes of both of said first and second wrists passing through a first common point on said first pivot axis, said second and third wrists being connected along a second pivot axis about which said second and third wrists relatively rotate, center axes of both of said second and third wrists passing through a second common point on said second pivot axis, and having a first driving motor mounted in an inner surface of said first wrist for driving said second wrist, a first reduction gear for directly transmitting the driving force of said first driving motor to said second wrist, and a second driving motor mounted in the inner surface of said second wrist for driving said third wrist, a second reduction gear for directly transmitting the driving force of said second driving motor to said third wrist, wherein said first and second driving motors are disposed on the central axis of said forearm; and
   an operating part which is connected to said forearm's other end.

2. A robot according to claim 1, characterized in that said operating part comprises a welding torch.

3. A robot according to claim 1, further comprising a first link, one end of which is connected to said one end of said upper arm, and a second link, one end of which is connected to the other end of said first link.

4. A robot according to claim 3, characterized in that the first wrist is connected to said other end of said upper arm and to the other end of said second link.

5. A robot according to claim 4 further comprising bearing means, characterized in that said first wrist is supported by said upper arm and said second link through said bearing means.

6. A robot according to claim 1, characterized in that said second wrist is rotationally driven in the same direction as the rotating direction of said first wrist driven by said first driving motor.

7. A robot according to claim 6, characterized in that said third wrist is rotated around the central axis of said forearm.

8. A robot according to claim 1, characterized in that said forearm includes a fourth wrist connected to said third wrist.

9. A robot according to claim 8, characterized in that a third driving motor drives said fourth wrist, and a third reduction gear directly transmits the driving force of said third driving motor to said fourth wrist, said third and fourth wrists being connected along a third pivot axis, center axes of said third and fourth wrists passing through a third common point on said third pivot axis, said third driving motor and said third reduction gear being mounted in an inner surface of said third wrist.

10. A robot according to claim 9, characterized in that said third driving motor is disposed on the central axis of said forearm.

11. A robot according to claim 10 further comprising harmonic drive means, characterized in that said second wrist is connected to said first wrist through said harmonic drive means.

12. A robot according to claim 11, characterized in that said second wrist is rotated around the central axis of said forearm.

13. A robot according to claim 12, characterized in that said third wrist is rotated around the second wrist.

14. A robot according to claim 13, characterized in that said fourth wrist is rotated around the central axis of said forearm.

* * * * *